(12) United States Patent
Jin

(10) Patent No.: US 7,099,248 B2
(45) Date of Patent: Aug. 29, 2006

(54) METHOD OF CHANGING A ROTATING MODE BETWEEN CONSTANT ANGULAR VELOCITY AND CONSTANT LINEAR VELOCITY

(75) Inventor: Cheol Jin, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/863,273

(22) Filed: May 24, 2001

(65) Prior Publication Data

US 2002/0003761 A1    Jan. 10, 2002

(30) Foreign Application Priority Data

May 27, 2000    (KR)    .............................. 2000-28890

(51) Int. Cl.
*G11B 15/46*    (2006.01)
(52) U.S. Cl. .............................. 369/47.48; 369/53.34; 369/53.43
(58) Field of Classification Search ............. 369/47.55, 369/47.48, 53.43, 53.34, 47.35; G11B 7/00
See application file for complete search history.

(56) References Cited

U.S. PATENT DOCUMENTS

| | | | | |
|---|---|---|---|---|
| 4,766,502 A | * | 8/1988 | Mashimo | .................... 386/15 |
| 4,780,866 A | * | 10/1988 | Syracuse | ................. 369/59.14 |
| 4,977,553 A | * | 12/1990 | Yokogawa | ............... 369/44.26 |
| 5,182,741 A | * | 1/1993 | Maeda et al. | ........... 369/133 X |
| 5,214,627 A | * | 5/1993 | Nakashima et al. | ..... 369/275.3 |
| 5,283,775 A | * | 2/1994 | Finkelstein et al. | ...... 369/53.37 |
| 5,377,178 A | * | 12/1994 | Saito et al. | ............ 369/124.07 |
| 5,506,824 A | * | 4/1996 | Fairchild et al. | ......... 369/47.22 |
| 5,737,306 A | * | 4/1998 | Ito et al. | .................. 369/275.1 |
| 5,751,676 A | * | 5/1998 | Kusano et al. | ........... 369/47.41 |
| 5,796,711 A | * | 8/1998 | Tomita et al. | ....... 369/275.3 X |
| 5,828,639 A | * | 10/1998 | Kobayashi et al. | ........ 369/47.4 |
| 5,852,599 A | * | 12/1998 | Fuji | ........................ 369/275.4 |
| 5,883,866 A | * | 3/1999 | Shimizume et al. | ..... 369/47.41 |
| 5,946,279 A | * | 8/1999 | Okada et al. | ......... 369/47.48 X |
| 5,999,504 A | * | 12/1999 | Aoki | ......................... 369/47.4 |
| 6,028,828 A | * | 2/2000 | Maeda | ..................... 369/47.4 |
| 6,031,801 A | * | 2/2000 | Ishikawa et al. | ......... 369/47.24 |
| 6,055,219 A | * | 4/2000 | Ho et al. | .................. 369/53.29 |
| 6,128,261 A | * | 10/2000 | Suzukji | ................... 369/47.48 |
| 6,212,143 B1 | * | 4/2001 | Teshirogi et al. | ........ 369/47.45 |
| 6,269,058 B1 | * | 7/2001 | Yamanoi et al. | ..... 369/47.48 X |
| 6,292,458 B1 | * | 9/2001 | Eguchi et al. | ........... 369/275.3 |
| 6,345,023 B1 | * | 2/2002 | Fushimi et al. | ...... 369/47.48 X |
| 6,570,831 B1 | * | 5/2003 | Choi | ....................... 369/47.28 |

* cited by examiner

*Primary Examiner*—A M Psitos
(74) *Attorney, Agent, or Firm*—Birch, Stewart, Kolasch & Birch, LLP

(57) ABSTRACT

The present invention relates to a method of changing a recording mode from CAV (Constant Angular Velocity) mode to CLV (Constant Linear Velocity) mode in the middle of recording data to a disk recording medium. A method according to the present invention reads ATIP-framed data encoded in a wobble signal formed along a spiral physical track while recording input data to a recording medium, and detects a sync signal contained in the read ATIP-framed data. Another method measures the frequency of a low-frequency component of the wobble signal instead of reading ATIP-framed data. These two methods determine, in common, when to change the recording mode from CAV to CLV based on the period of the detected sync signal or the measured frequency. The present invention makes it possible to record input data to an entire area of a disk more rapidly without fatal errors such as imperfect writing. As a result, total recording time can be reduced with stable recording guaranteed.

19 Claims, 4 Drawing Sheets

METHOD OF CHANGING A ROTATING MODE BETWEEN CONSTANT ANGULAR VELOCITY AND CONSTANT LINEAR VELOCITY

BACKGROUND OF THE INVENTION

1. Field of the Invention

The present invention relates to a method of changing a recording mode from CAV (Constant Angular Velocity) to CLV (Constant Linear Velocity) in the middle of recording data to a disk recording medium.

2. Description of the Related Art

In general, a disk recording device writes input data at a speed slower than 2×, so that it writes data to a writable disk such as CD-R and CD-RW at CAV mode for entire recording area of the disk.

In the meantime, the recording speed of a disk recording devices are becoming increasingly faster, which requires faster rotation speed of a writable disk. In the CAV mode, the linear velocity is increased in proportion to a radius as a recording point goes outward. However, if the linear velocity becomes faster than a critical speed, the properties of the medium are not sufficiently changed by an incident writing beam, or data to be write becomes underrun because the data writing rate becomes higher than maximum encoding rate of an installed encoding hardware.

Therefore, it is required that CAV mode should be changed to CLV at an appropriate point of a disk as shown in FIG. 1 under the condition of an increase in recording speed.

SUMMARY OF THE INVENTION

It is an object of the present invention to provide a recording mode changing method which detects a recording speed while recording data to a writable disk in CAV mode, and changes the recording mode to CLV mode if the detected recording speed exceeds a predetermined threshold.

A method of changing a recording mode according to the present invention, reads ATIP—(Absolute Time In Pregroove) framed data encoded in a wobble signal formed along a spiral physical track while recording input data to a recording medium, detects a sync signal contained in the read ATIP-framed data, and determines when to change the recording mode from CAV to CLV based on the period of the detected sync signal.

A method of changing a recording mode according to the present invention, records input data to an installed recording medium in CAV mode, measures frequency of a low-frequency component of a wobble signal, which is generated during said recording, formed along a spiral physical track and determines when to change the recording mode to CLV mode based on the measured frequency.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENT

In order that the invention may be fully understood, a preferred embodiment thereof will now be described with reference to the accompanying drawings.

Figure 1:
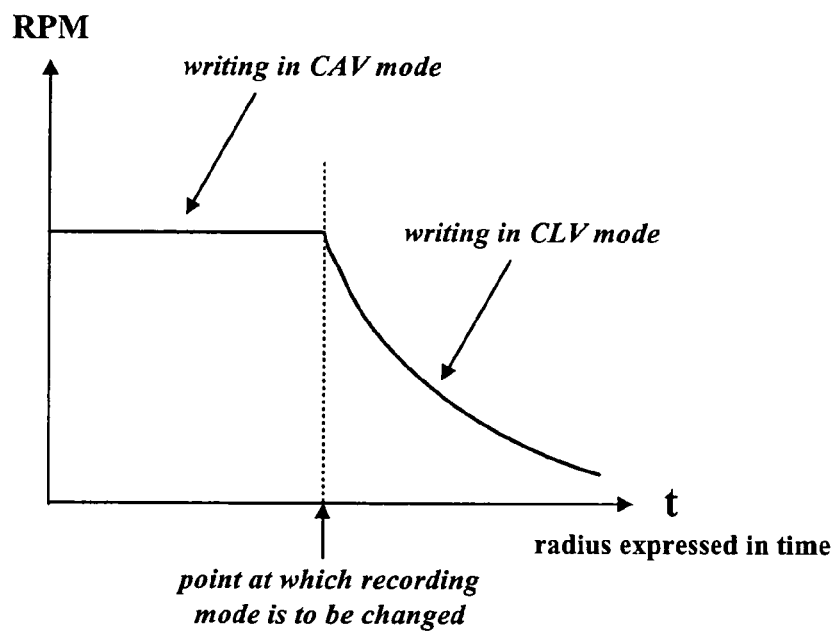
FIG. 1 shows an RPM graph to rotate a writable disk in recording data thereon.
Figure 2:
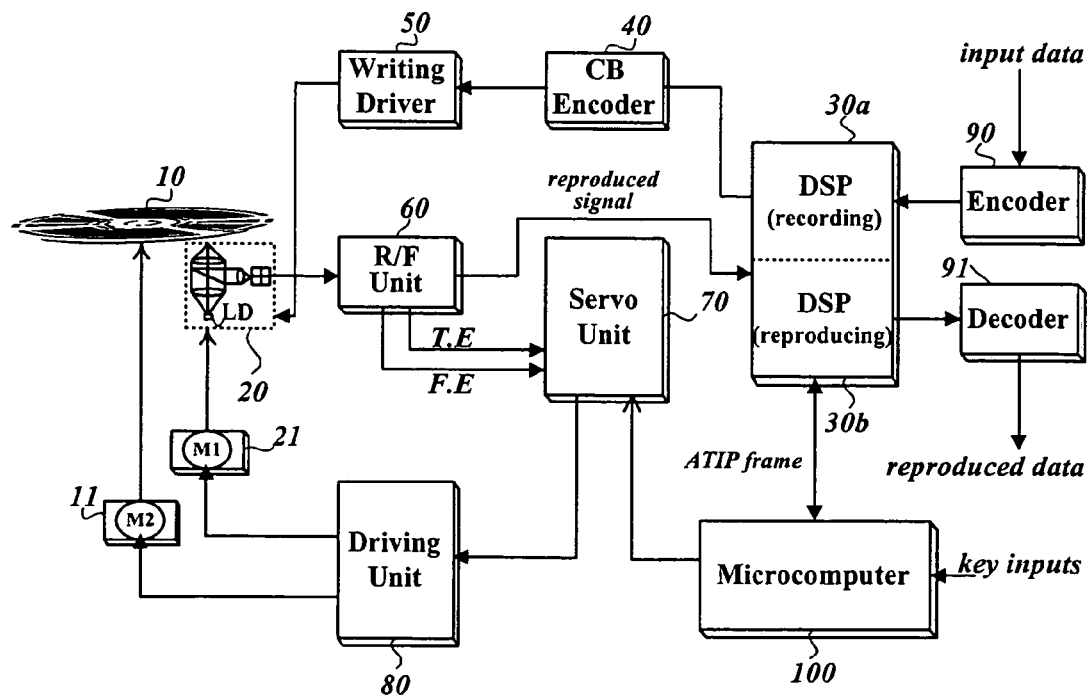
FIG. 2 is a block diagram of a disk device to which a recording mode changing method according to the present invention is applicable.

FIG. 2 is a block diagram of a disk device to which a recording mode changing method according to the present invention can be applied.

The disk device of FIG. 2 comprises an encoder 90 encoding input data; a digital recording signal processing unit 30a converting the encoded data into recording-formatted data while adding additional data such as error correction codes; a channel bit encoder 40 converting the recording-formatted data to bit streams; a writing driver 50 yielding a writing current according to an input bit stream; an optical pickup 20 writing signals corresponding to the writing current onto an optical disk 10 and reading the written signals from the optical disk 10; an R/F unit 60 yielding servo error signals TE and FE, and binary signals through combining the read signals from the disk 10; a driving unit 80 driving a spindle motor 11 and a sled motor 21; a servo unit 70 controlling the driving unit 80 and the pickup 20 based upon the servo error signals TE and FE, and the rotation speed of the disk 10; a digital reproducing signal processing unit 30b restoring encoded data from the binary signals using an internal clock synchronized with the binary signals; a decoder 91 decoding the restored data into original data; and a microcomputer 100 controlling overall operation of the above elements, measuring the period of sync signal in ATIP frames provided from the digital reproducing signal processing unit 30b, and changing recording mode between CAV and CLV based on the measured period.

Figure 3:
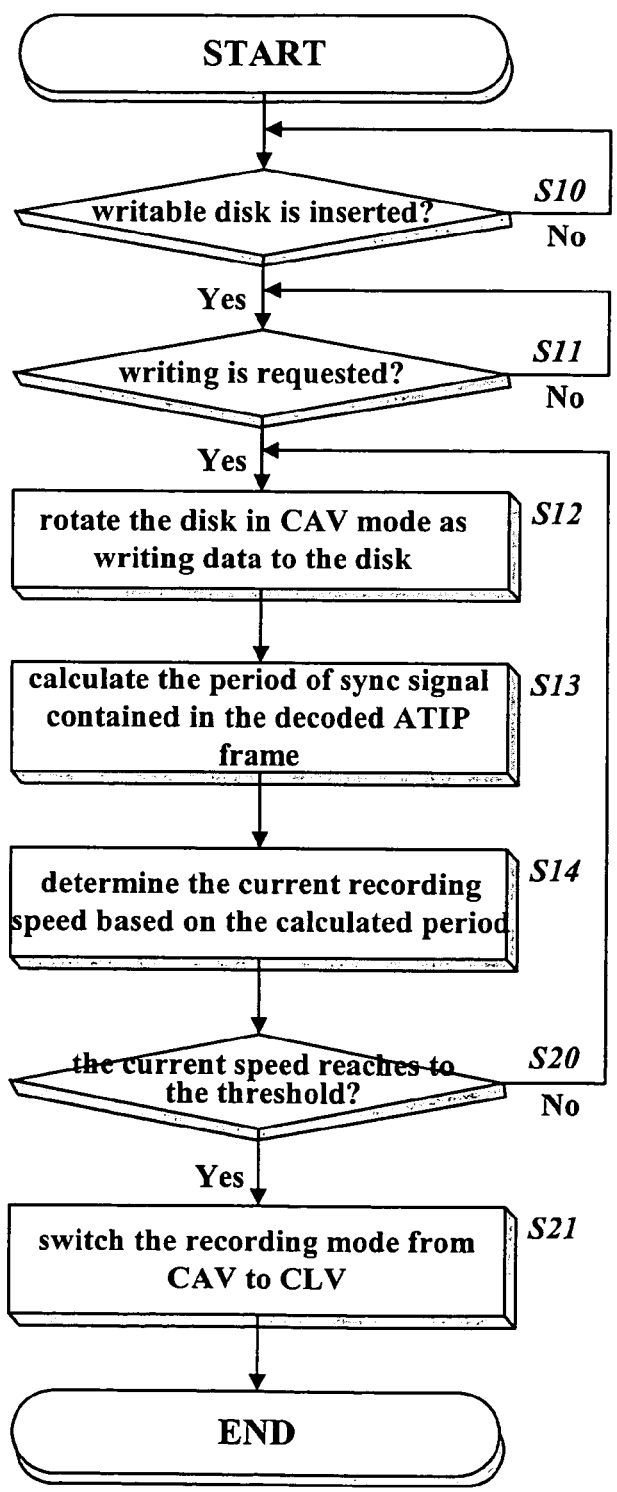
FIG. 3 is a flow diagram of a recording mode changing method according to the present invention.

FIG. 3 is a flow diagram of a recording mode changing method according to the present invention. This method of FIG. 3, conducted by the disk device of FIG. 2 is explained in detail.

After a writable disk CD-R or CD-RW 10 is installed in a tray (not figured) equipped in the disk device (S10), if data recording is requested to the microcomputer 100 (S11), the microcomputer 100 rotates the spindle motor 11 through controlling the servo unit 70 and the driving unit 80. As the spindle motor 11 rotates, the installed disk 10 starts to rotate. The microcomputer 100 regulates the applied driving voltage to be constant through the servo unit 70 to rotate the disk 10 in CAV mode.

While the writable disk 10 is rotating in CAV mode, input data are recorded through the following operations.

If external data are received for recording, the encoder 90 encodes the received data into compressed data of pre-specified format, for example, MPEG format. The digital recording signal processing unit 30a constructs ECC (Error Correction Code) block through appending inner and outer parities to the encoded data, and the channel bit encoder 40 converts the digital bit streams of the ECC block into corresponding PWM (Pulse Width Modulated) signals and applies the modulated signals to the optical driver 50 to record the modulated signals to the disk 10. As a result, the external data are recorded along the spiral track formed in the disk 10 (S12) within the CAV recording zone depicted in FIG. 4.

Figure 5:
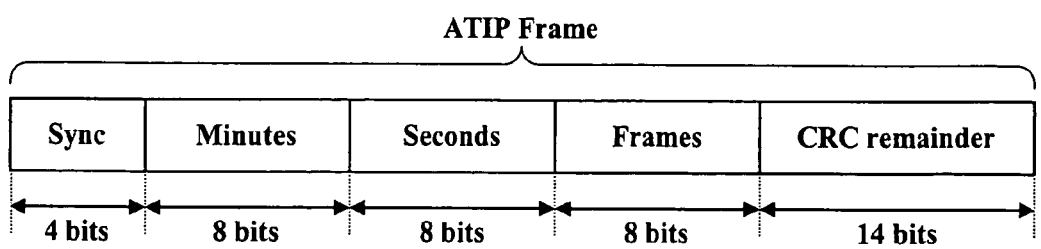
FIG. 5 is a format of ATIP frame written in a wobble signal.

As this recording progresses, the recording track point becomes more and more distant from center. Thus, the microcomputer 100 keeps checking how far the current recording point is from center. To conduct this checking operation, the microcomputer 100 extracts a sync signal from each ATIP-framed data, whose format is shown in FIG. 5, provided from the digital reproducing signal processing unit 30b, calculates the interval between two extracted sync signal (S13), that is, the period of sync signal, determines the current recording speed based on the period of sync signal (S14), and compares the determined recording speed with a threshold speed, for example, 8× which guarantees enough stable and error-free writing. The ATIP-framed data are encoded into a wobble signal formed along a spiral physical track of the writable disk 10.

Figure 4:
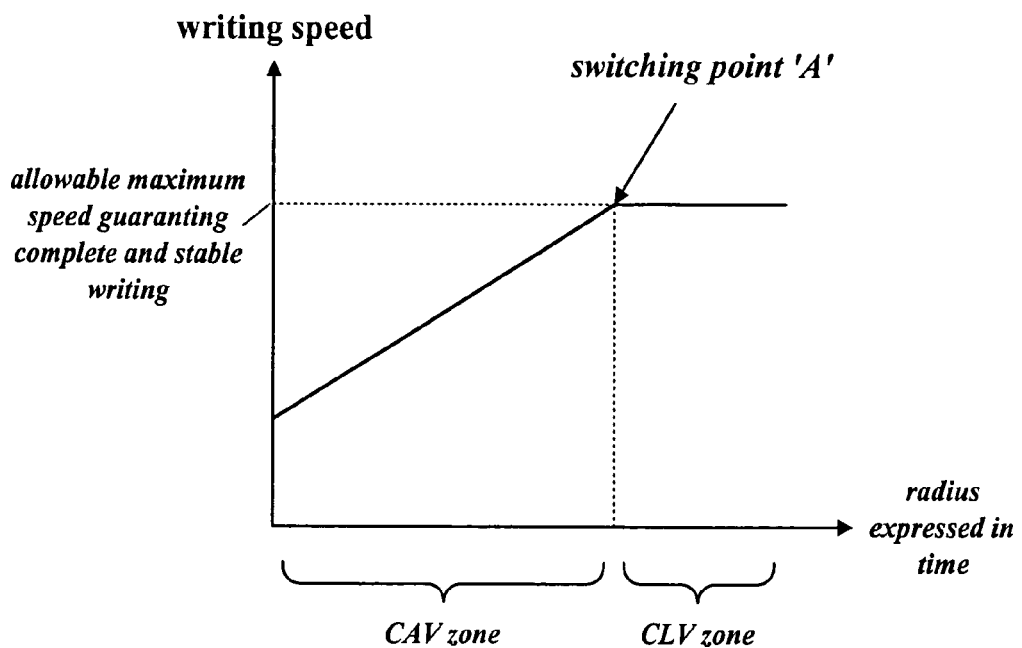
FIG. 4 shows a graph of recording speed when recording data according to the present invention.

The above sequential operations are conducted continuously until the current recording position reaches to the critical point 'A' marked in FIG. 4 where the linear velocity on position 'A' becomes the threshold speed.

While conducting the above sequential operations, if the current recording speed becomes equal to the threshold (S20), the microcomputer 100 sets the recording mode to CLV mode from CAV (S21).

In CLV recording mode, the microcomputer 100 decreases the driving voltage being applied to the spindle motor 11 gradually to reduce the rotation speed of the disk 10 as the current recording point advances outward. This gradual decrement of the applying voltage gives constant linear velocity of threshold speed wherever the recording point is outside the critical point 'A'.

Therefore, the external data can be recorded much more quickly up to the most outer peripheral at the maximum linear speed.

Figure 6:
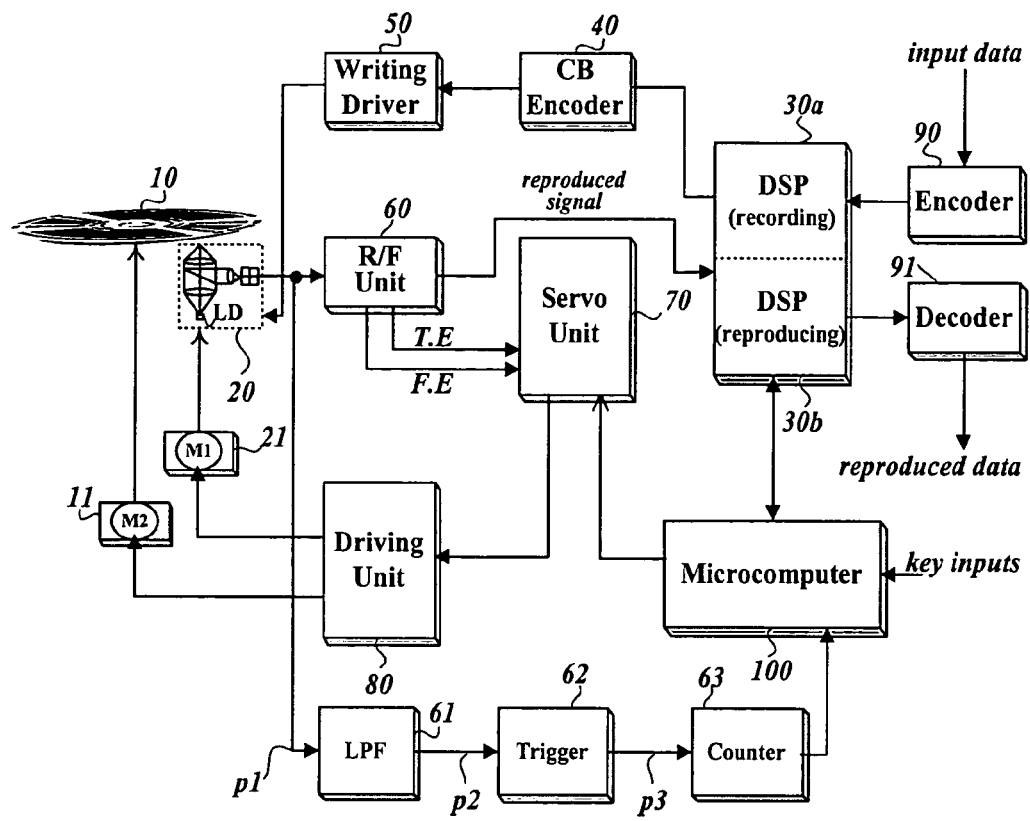
FIG. 6 is a block diagram of a disk device to which another recording mode changing method according to the present invention is applicable.

FIG. 6 is a block diagram of a disk device to which another recording mode changing method according to the present invention is applied. The disk device of FIG. 6 comprises a lowpass filter 61 passing low-frequency component, which is a wobble signal including ATIP-framed data, included in the reproduced signals from the disk 10; a trigger 62 triggering the sinusoidal wobble signal with a given slicing level; and a counter 63 counting the pulses of the triggered square wave. The remaining components of this device are same with the disk device of FIG. 2.

The disk device according to another embodiment of the present invention measures the frequency of the wobble signal including ATIP-framed data, instead of the period of sync signal included in the ATIP frame, to determine when to switch recording mode. This operation is as follows.

Figure 7:
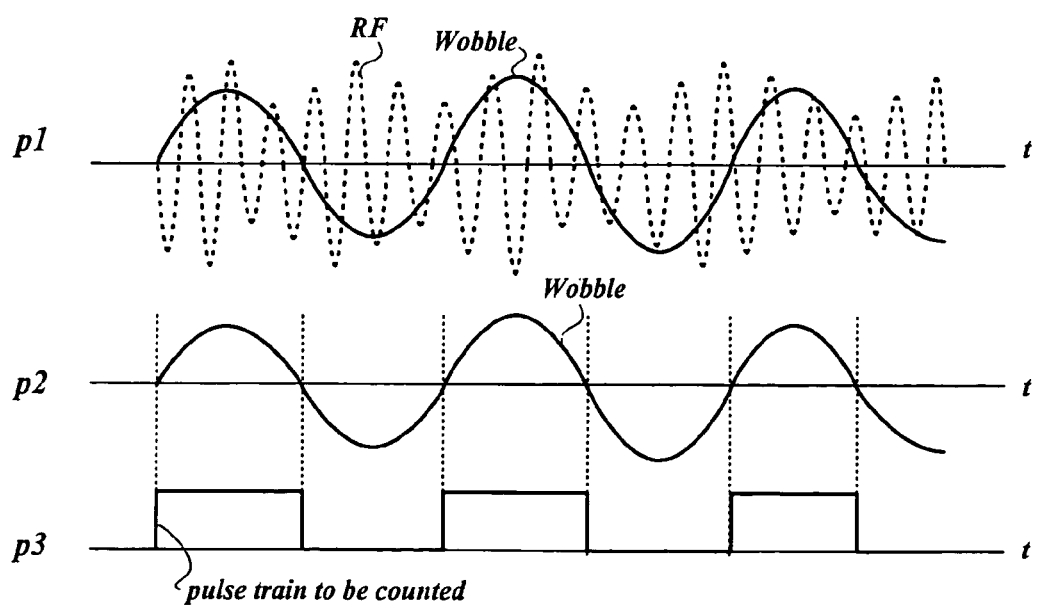
FIG. 7 shows waveforms detected at several points of the disk device of FIG. 6.

The lowpass filter 61 receives the reproduced signals ('p1' in FIG. 7) from the disk 10 and passes only a sinusoidal wobble signal ('p2' in FIG. 7) of low-frequency component. The trigger 62 triggers the sinusoidal wobble signal to form a square wave ('p3' in FIG. 7), and the counter 63 counts every pulse of the square wave for a predetermined time. The microcomputer 100 receives the counted value, and calculates the frequency of the wobble signal, which is proportional to the recording speed on the current recording spot, based on the counted value.

The microcomputer 100 keeps checking the current recording speed through the above operations. If the current recording speed being checked reaches to a threshold, that is, allowable maximum speed, the microcomputer 100 becomes aware that it is time to switch recording mode from the current recording position, so that it changes recording mode to CLV from the critical point marked 'A' in FIG. 4. Thus, the input data are recorded at constant maximum linear velocity outside the critical point.

The recording mode changing method according to the present invention makes it possible to record input data to an entire area of a disk more rapidly without fatal errors such as imperfect writing, thereby reducing recording time with stable recording guaranteed.

The invention may be embodied in other specific forms without departing from the spirit or essential characteristics thereof. The present embodiments are Therefore to be considered in all respects as illustrative and not restrictive, the scope of the invention being indicated by the appended claims rather than by the foregoing description and all changes which come within the meaning and range of equivalency of the claims are therefore intended to be embraced therein.

The invention claimed is:

1. A method of changing a recording mode from CAV (Constant Angular Velocity) to CLV (Constant Linear Velocity), comprising the steps of:
    (a) detecting a sync signal from signals embedded in a wobbled physical track;
    (b) checking the frequency of the detected sync signal; and
    (c) determining whether to change the recording mode or not based on the checked frequency.

2. The method set forth in claim 1, wherein in step (a) said sync signal is detected while recording input data to a recording medium in CAV mode.

3. The method set forth in claim 1, wherein in step (a), said sync signal is a predetermined signal and said detecting step detects a period of said predetermined signal.

4. The method set forth in claim 1, wherein in step (c), changing the recording mode changes a rotating mode from CAV to CLV according to said checked frequency.

5. The method set forth in claim 1, wherein in said step (c) said determining determines a recording speed according to said checked frequency.

6. The method set forth in claim 5, wherein the determined recording speed is based on the predetermined signal.

7. The method set forth in claim 6, wherein said determining includes comparing the determined recording speed with a predetermined speed.

8. The method set forth in claim 7, wherein the predetermined speed is determined by an encoding speed of an encoder or properties of the recording medium.

9. A method of changing a recording mode between CAV (Constant Angular Velocity) ad CLV (Constant Linear Velocity), comprising the steps of:
    (a) detecting a signal embedded in a wobbled physical track;
    (b) checking the frequency of the detected signal; and
    (c) determining whether to change the recording mode or not based on the checked frequency.

10. The method set forth in claim 9, wherein in step (a) said signal is detected while recording input data to a recording medium in CAV mode.

11. The method set forth in claim 9, wherein in step (a), said signal is a predetermined signal and said detecting step detects a period of said predetermined signal.

12. The method set forth in claim 9, wherein in step (c), changing a recording mode changes a rotating mode from CAV to CLV according to said checked frequency.

13. The method set forth in claim 9, wherein in step (c) said determining determines a recording speed according to said checked frequency.

14. The method set forth in claim 9, wherein in step (b), the step of checking includes measuring the frequency of a low frequency component of said signal, said signal being formed along a spiral; physical track.

15. The method set forth in claim 14, further including comparing the measured frequency with a predetermined frequency.

16. The method set forth in claim 15, wherein the predetermined frequency is determined by an encoding speed of an encoder or properties of a recording medium.

17. The method set forth in claim 15, further including determining when to change the recording mode to CLV based on the comparing step.

18. The method set forth in claim 14, wherein said signal is a wobble signal and said measuring converts the wobble signal to a square wave and counts pulses of the square wave.

19. An apparatus for of changing a recording mode between CAV (constant Angular Velocity) and CLV (constant Linear Velocity), the apparatus comprising:

(a) detecting means detecting a signal from signals embedded in a wobbled physical track;

(b) checking means checking the frequency of the detected signal; and (c) determining means determining whether to change the recording mode or not based on the checked frequency.

* * * * *